United States Patent [19]

Thomas

[11] Patent Number: 5,293,755
[45] Date of Patent: Mar. 15, 1994

[54] AIR CONDITIONING LOAD MANAGEMENT CONTROL SYSTEM

[76] Inventor: Charles V. Thomas, c/o Virginia Power Telecommunications 104 Wilden Dr., Ashland, Va. 23005-9413

[21] Appl. No.: 987,776

[22] Filed: Dec. 9, 1992

[51] Int. Cl.⁵ .............................................. F25B 41/00
[52] U.S. Cl. ........................................ 62/208; 307/39; 236/91 R
[58] Field of Search ................. 307/39; 62/208; 236/91 D, 91 R

[56] References Cited

U.S. PATENT DOCUMENTS

| | | | |
|---|---|---|---|
| 3,925,680 | 12/1975 | Dixon | 307/39 |
| 4,089,462 | 5/1978 | Bradford | 236/68 B |
| 4,262,491 | 4/1981 | Chorey et al. | 62/185 |
| 4,289,272 | 9/1981 | Murase et al. | 236/91 D |
| 4,345,162 | 8/1982 | Hammer et al. | 307/39 |
| 4,485,635 | 12/1984 | Sakano | 62/209 |
| 4,495,778 | 1/1985 | Shaw | 62/209 |
| 4,601,329 | 7/1986 | Sheridan | 165/22 |
| 4,898,230 | 2/1990 | Tsuchiyama et al. | 165/12 |
| 4,930,698 | 6/1990 | Takekawa et al. | 236/49.3 |
| 5,038,851 | 8/1991 | Mehta | 165/12 |

FOREIGN PATENT DOCUMENTS

| | | | |
|---|---|---|---|
| 0003942 | 1/1986 | Japan | 62/208 |
| 0021313 | 1/1990 | Japan | 236/91 R |

Primary Examiner—William E. Wayner
Attorney, Agent, or Firm—Cushman, Darby & Cushman

[57] ABSTRACT

A load management control system is provided for an air conditioner. The system includes an outdoor temperature sensor for sensing outdoor temperature of the outside of an enclosure to be air-conditioned and an indoor temperature sensor for sensing an indoor temperature of the enclosure. A device is provided for determining a difference in output of the indoor and outdoor temperature sensors. A device is provided for comparing the difference in output of the indoor and outdoor temperature sensors with a reference input. The system further includes a device for detecting an external controlling signal from an input device coupled to the system. A control device is provided for controlling an air conditioner control circuit based upon input from the comparing device and the detecting device. When an allowable temperature differential is exceeded, the controlling device opens at least one contact to interrupt the air conditioner control circuit so as to reduce electrical load. The controlling device closes the contact to restore the operation of the air conditioner control circuit when the temperature differential is no longer exceeded.

12 Claims, 9 Drawing Sheets

AIR CONDITIONING LOAD MANAGEMENT CONTROL SYSTEM

BACKGROUND OF THE INVENTION

1. Field of the Invention

This invention relates to a control system for controlling the operation of an air conditioning system, and more particularly to a load management control system for reducing air conditioning load during peak periods.

2. Description of the Art

The control of temperature in enclosed areas such as residential and commercial buildings is important for comfort of the inhabitants as well as for efficiency. Energy considerations become important when the outside temperature substantially exceeds an indoor temperature set point. In conventional air conditioning systems, automatic controls maintain cooling levels in a selected range. Most thermostatic controls permit the user to set a prescribed temperature above which the system will energize to cool the building. However, when the outdoor temperature greatly exceeds the indoor temperature set point, a substantial energy load is required to maintain the indoor temperature. As a result, excessive cooling of the building adversely effects the physical condition of building occupants, and energy is wasted since the air conditioner is operated to provide an energy load in excess of that required to maintain a comfortable interior temperature.

Prior systems have attempted to control the indoor temperature based upon the outdoor temperature. U.S. Pat. No. 4,289,272 discloses a temperature control apparatus which operates by calculating a desired indoor temperature using a predetermined linear function of outdoor temperature.

U.S. Pat. No. 4,089,462 discloses a temperature control system for shifting the indoor temperature set point in accordance with outdoor temperature. Heating and cooling input to a room of a building is controlled based upon the outdoor temperature and a K-Factor, to maintain a constant indoor temperature. However, careful analysis of the dwelling heat transfer ability is required for such control.

While the control systems described in the above references provide a significant improvement in air conditioning systems, these systems require either complicated algorithms or a study of particular building characteristics to facilitate temperature control.

It would be desirable, therefore, to provide a simple and more effective means of controlling the load requirements for an air conditioning system based upon a difference between indoor and outdoor temperature.

SUMMARY OF THE INVENTION

It is an object of the invention to provide an air conditioning load management control system which automatically provides load reduction that tracks the increase of outdoor temperature above the indoor temperature.

It is another object to provide a control system which provides consistent control among users without the need to address particular characteristics of the user's dwelling or air conditioning equipment and without employing a special algorithm.

It is a further object of the invention to provide an air conditioning load management system that can be easily installed and maintained.

These objectives are obtained in accordance with the principles of the present invention by providing a load management control system for an air conditioner including an outdoor temperature sensor for sensing outdoor temperature of the outside of an enclosure to be air-conditioned and an indoor temperature sensor for sensing an indoor temperature of the enclosure. A device is provided for determining a difference in output of the indoor and outdoor temperature sensors. Another device is provided for comparing the difference in output of the indoor and outdoor temperature sensors with a reference input. The system further includes a device for detecting an external controlling signal from an input device coupled to the system. A control device is provided for controlling an air conditioner control circuit based upon input from the comparing device and the detecting device. When an allowable temperature differential is exceeded, the controlling device opens at least one contact to interrupt the air conditioner control circuit shutting down the air conditioner's compressor so as to reduce electrical load. The controlling device closes the contact to restore the operation of the air conditioner control circuit when the temperature differential is no longer exceeded.

DETAILED DESCRIPTION OF THE PREFERRED EMBODIMENT

The load management control system 10 will now be described with reference to FIGS. 1-3, which are schematic diagrams of the components of the system 10, according to the present invention.

The system 10 includes a conventional indoor temperature sensor 12, which is a solid state transducer that provides an output voltage proportionate to temperature. In the illustrated embodiment, a National Semiconductor LM335 Precision Temperature Sensor is used having a calibration potentiometer (R2). However, other sensors that produce a linear output voltage with respect to temperature may be used, such as thermistors. The sensor 12 should preferably be calibrated to an accuracy of 0.15 degrees Fahrenheit or better when operated with a mid-scale voltage output of approximately 5 volts. In the illustrated embodiment (FIG. 2), the indoor temperature sensor 12 is connected to the air conditioner load control circuit 52 by a twisted wire pair 16. No external power wiring is required. The sensor 12 can be mounted in an enclosure and sized smaller than a typical household thermostat.

An outdoor temperature sensor 18 is provided outside the enclosure to be air-conditioned. The outdoor temperature sensor 18 is electrically identical to the indoor temperature sensor 12. In the illustrated embodiment, a second LM335 Precision Temperature Sensor is used having a calibration potentiometer (R1). The outdoor sensor 18 is preferably encapsulated in a waterproof module (not shown) and mounted in a small vented outdoor box. The outdoor temperature sensor 18 is also electrically connected to the air conditioning load control circuit 52 by a twisted wire pair 16.

A differential amplifier circuit 20 is provided which produces a voltage level corresponding to the difference in output of the indoor sensor 12 and outdoor sensor 18. In the illustrated embodiment, differential amplifier circuit 20 is a conventional operational amplifier such as National Semiconductor LM324 or a generic 741 operational amplifier. The output of amplifier 20 is sent to set point level control 22 via line 21. As shown in FIG. 3, the differential amplifier circuit components include an operational amplifier 23, resistors R3, R4, R5, R6, R7, R8, R9 and capacitor C1.

Figure 7:
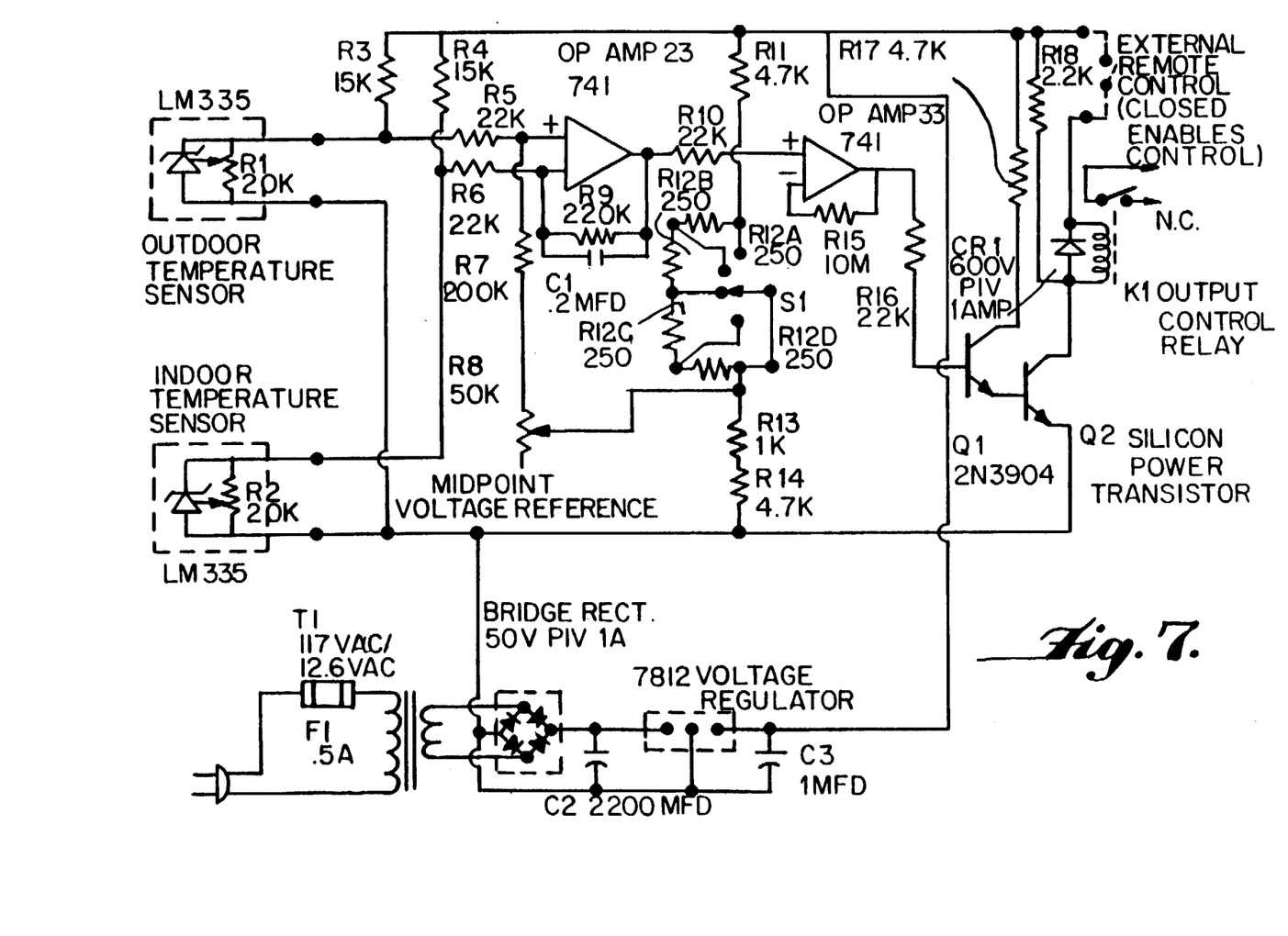
FIG. 7 is a schematic diagram of an analog circuit of the present invention having selectable fixed set points.

The set point control 22 is built around a second operational amplifier 33 integrated circuit. When the input received from differential amplifier circuit 20 exceeds a certain fixed voltage, such as 0 to 1 volts with reference to a Midpoint Voltage Reference (used as a center reference which is exactly half of the power supply voltage), supplied from adjustable reference voltage source 24 (shown as R12 in FIG. 3), the set point control 22 generates a positive voltage level at the input of the control logic 26 (FIG. 1). This will initiate load control until the inside temperature raises to a point where the input voltage drops below the set point value if a closed circuit is present across external contact control input 32. The set point can be field adjusted to a predetermined temperature differential before the system 10 begins shedding load. The system may have more than one set point, any of which can be selected by external contacts. FIG. 3 shows a single adjustable set point using potentiometer R12 to calibrate the single value. In the alternative, FIG. 7, shows selection of fixed points approximately 4 degrees apart using switch S1. A series of fixed resisters replaces potentiometer R12. With this arrangement, various temperature differential arrangements can be selected by closing the appropriate contact as required for prevailing conditions. For example, load management may be required during moderately warm outdoor temperatures. Selection of a lower temperature differential will make the device more effective under these operating conditions. Switch S1 may be replaced with external contacts to permit remote selection.

In the illustrated embodiment, the adjustable reference voltage source 24 is developed by using precision resistors across a regulated voltage power supply. As shown in FIG. 3, the adjustable reference voltage source 24 includes resistors R11, R12, R13 and R14, and the set point control 22 includes an operational amplifier 33, R10, and R15.

Figure 1:
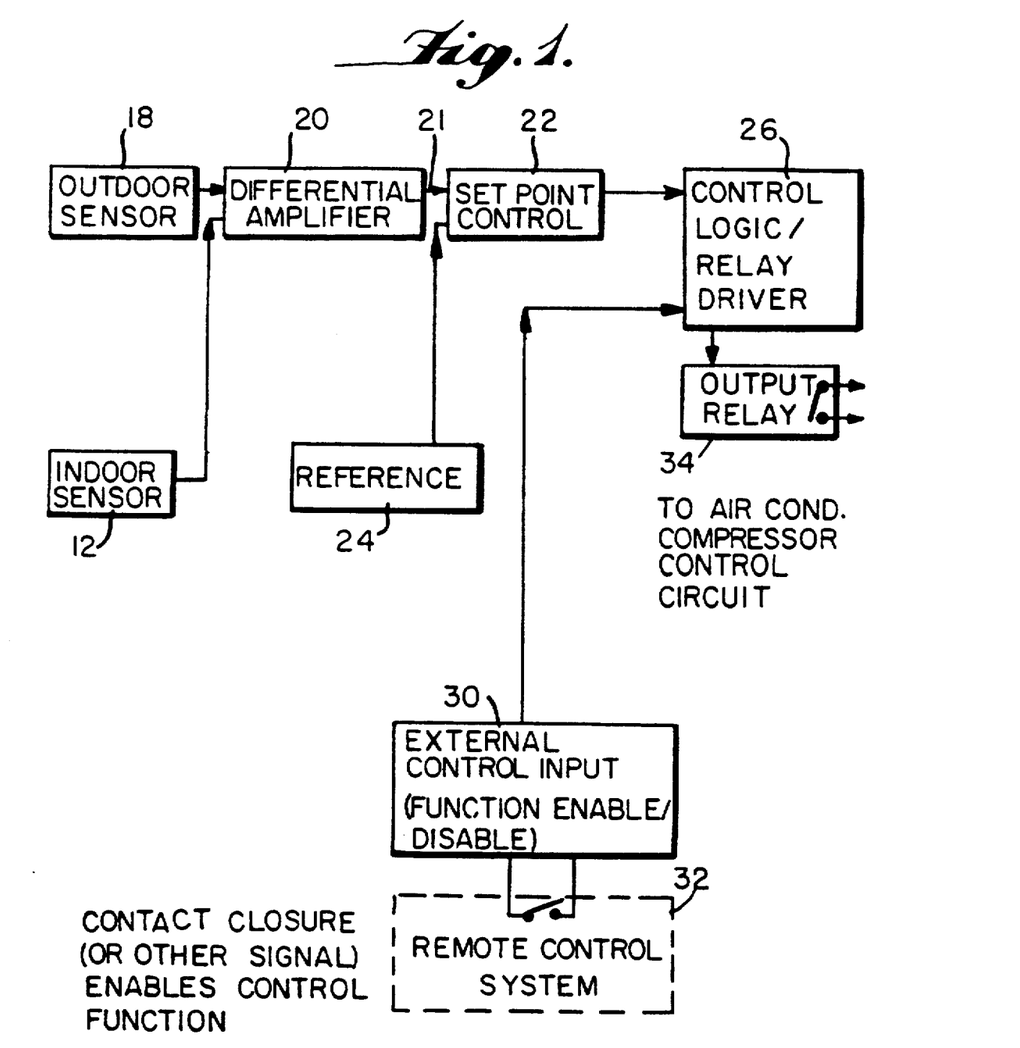
FIG. 1 is a schematic diagram of an air conditioning load management control system provided in accordance with the principles of the present invention.
Figure 8:
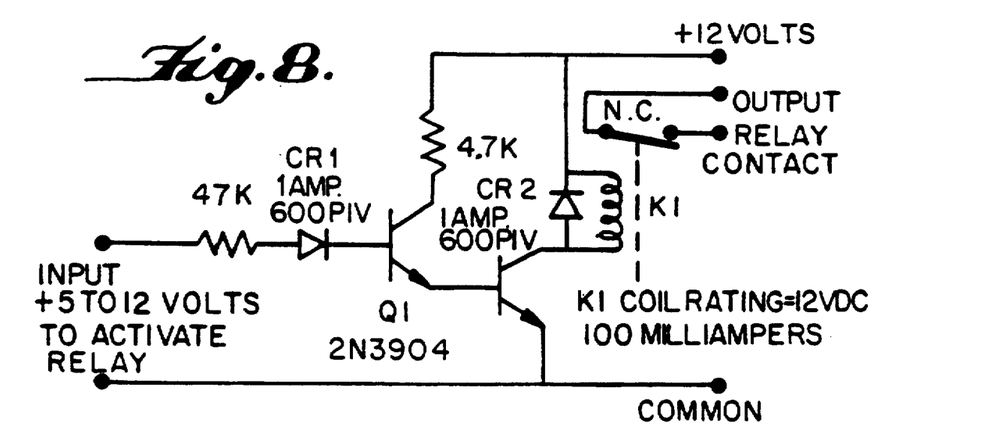
FIG. 8 is schematic diagram of a relay driver circuit provided in accordance with the principles of the present invention.

As shown in FIG. 1, an external control input circuit 30 is used to determine when to enable or disable the function of the control via a remote control device 32. In the preferred embodiment, a preferably optically isolated input circuit is used to detect a dry contact closure for initiating load control. The load management control system 10 is intended for interfacing with existing conventional load management systems. Existing load management systems use the opening (or closing) of a contact to perform control functions. This contact is typically electrically isolated to permit it to be placed in the circuits of the user equipment which supply operating voltages. The dry contact design is preferable since it enables easy connection to these devices. However, any type of input, for example, logic levels from a microprocessor or decoder may be used provided the proper interface circuitry is present. As shown in FIG. 3, the control contact of the remote control device 32 is connected in series with the output control relay 34. If no external load controller 14 is available, additional circuitry can be added to permit the circuit to function with components of basic communication subsystems, such as paging radios or telephone communications that are capable of providing logic output based on received signals. The load management system can be modified to operate from any such communication subsystem by obtaining a subsystem that produces unique logic levels for enabling and disabling the control, based on received signals and developing interface circuitry to translate output from the communication subsystem into logic levels for enabling and disabling the load management control. FIG. 8 shows an example of a relay driver circuit for such purpose.

The control logic circuit 26 receives the input from the set point control 22 and the external control input circuit 30 to determine when to open output relay contacts 34. Preferably, the control logic circuit 26 also contains circuitry necessary to drive the output relay 34. If the allowable temperature differential is exceeded while the control contact of the remote control device 32 is closed, the control logic circuit 26 will open the contact 34 and interrupt the air conditioner compressor control circuit 36. The output relay 34 provides a contact that is connected in series with the air conditioner compressor control leads to turn off the unit during periods when load management is required.

Figure 10:
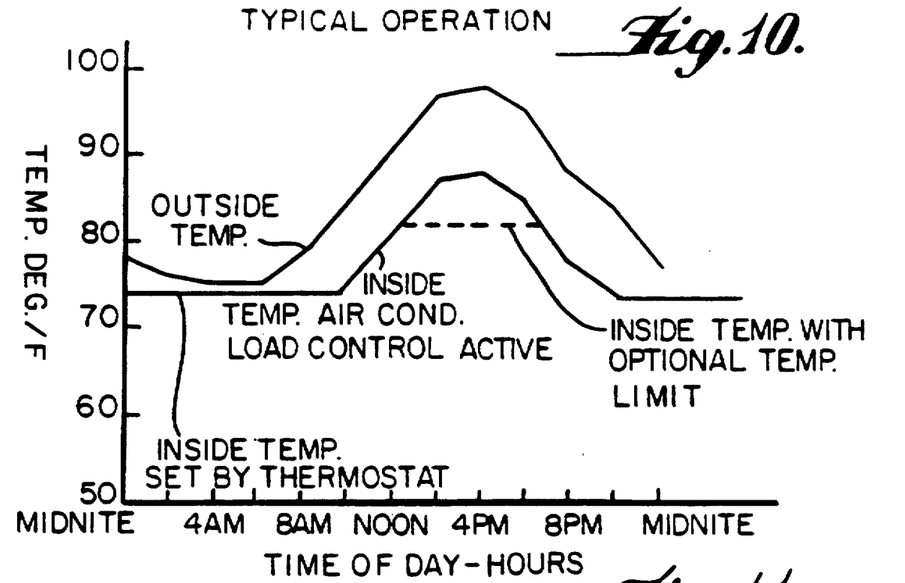
FIG. 10 is a graph showing the operation of the load management control system having a ramp-down feature.

FIG. 10 illustrates the operation of the load management system 10.

As shown, the outside temperature is tracked by the inside temperature. The system 10 interrupts the control circuit of the compressor 36 when the outside temperature exceeds the inside temperature by a set differential. The system provides for automatic load shedding and restoration. As the outside temperature increases, the constant differential causes the indoor temperature to track the outdoor temperature resulting in a proportionate shedding of load. Load restoration automatically occurs when the outside temperature falls to a point where it is less than the established differential plus the indoor temperature. Consequently, no special algorithms are required in the system to deliver smooth load shedding restoration.

An optional high indoor temperature limit control may be provided in the system 10 to keep the indoor temperature from exceeding a preset value. This feature can be used to limit customer discomfort should the outdoor temperature rise to a level where the inside temperature becomes excessive.

As shown in FIG. 10, the set point may be set at a value (i.e., 83° F.) which permits some cooling while providing load reduction. This feature makes the placement of the outdoor temperature sensor less critical.

Figure 4:
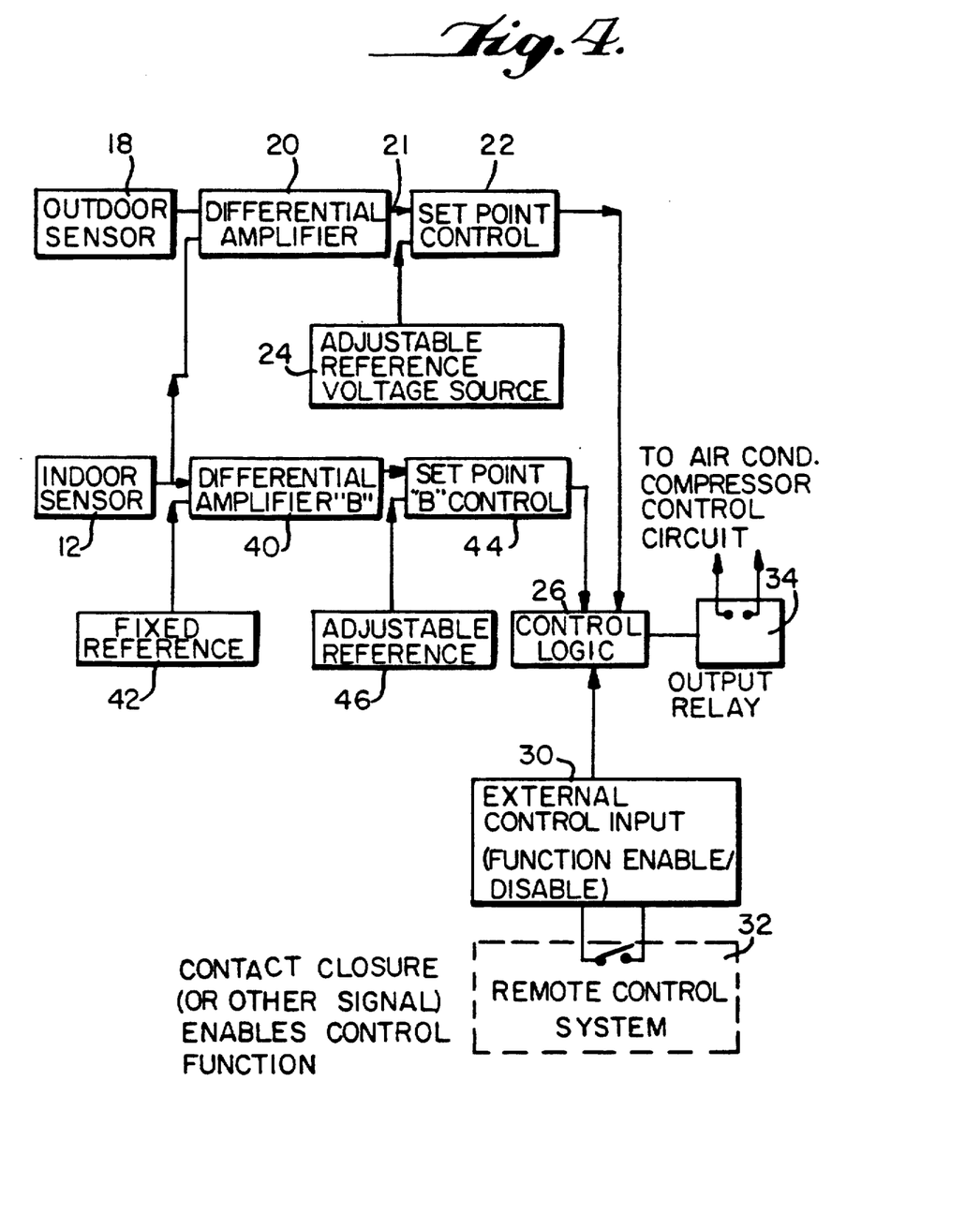
FIG. 4 is a schematic diagram of an air conditioning load management control system with optional high indoor temperature limit.

As shown in FIG. 4, an optional differential amplifier circuit, indicated at 40, is provided when high limit indoor temperature control is desired. This circuit compares the inside temperature to a fixed reference 42. The output is used to determine whether the inside temperature has exceeded a preset limit by the set point control 44. An operational amplifier, similar to operational amplifier 23 is used for this comparison function. This circuit is not required if high limit indoor temperature control is not required.

The output of the fixed reference 42 is used by the differential amplifier circuit 40 for comparison with the voltage of the input temperature sensor to determine when the high level limit has been exceeded. This circuit can be adjustable, allowing calibration of the high indoor temperature limit. The set point control 44 uses an operational amplifier to generate a voltage, should the high temperature limit be exceeded by the indoor temperature. The set point control 44 is determined by comparing the output of differential amplifier circuit 40 to adjustable reference 46. The output of the set point control 44 is sent to the control logic circuit 26 and when the set point is exceeded, the control logic circuit will block control of the air conditioner compressor.

Digital system control may also provide the same function as the above analog control by using microprocessor based functions.

Figure 5:
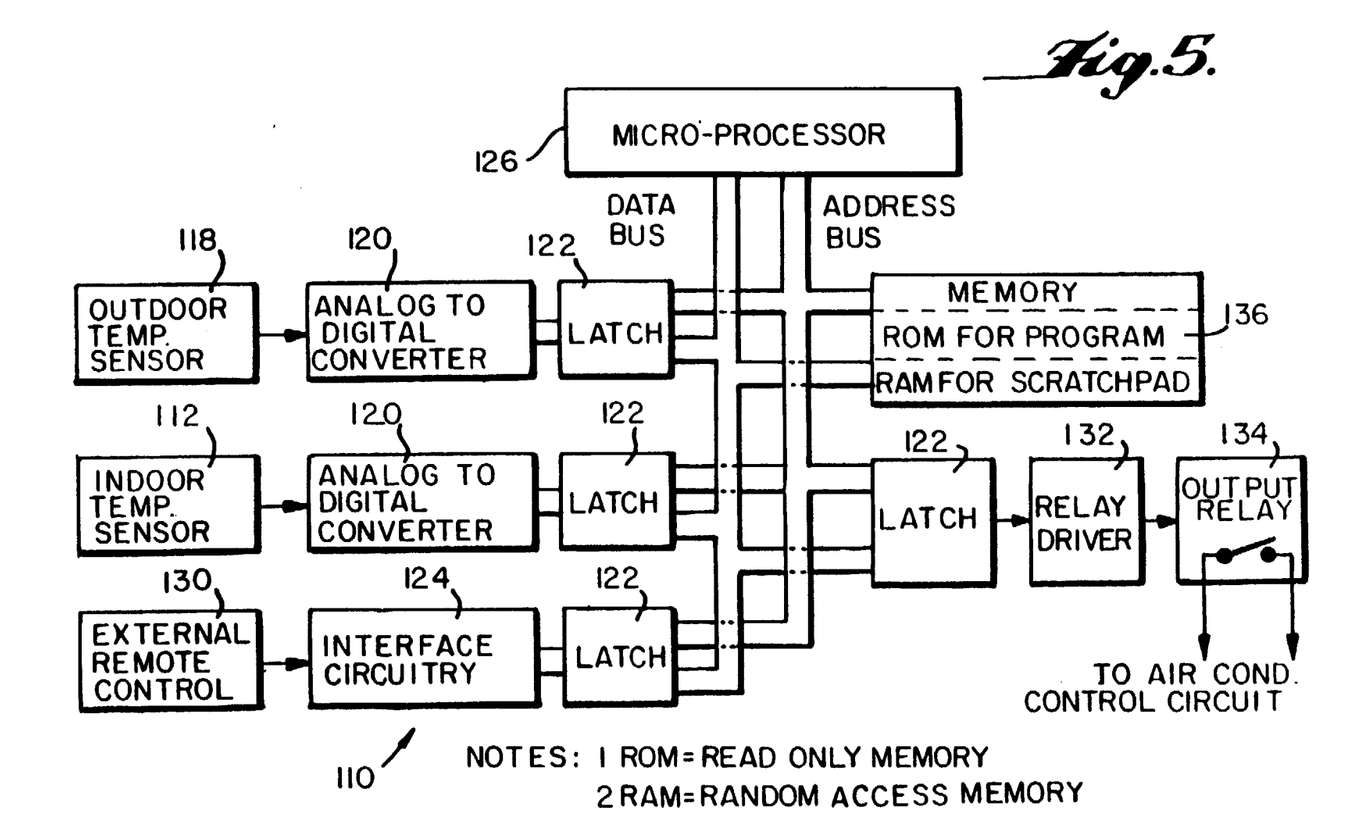
FIG. 5 is a schematic diagram of a digital load management control system provided in accordance with the principles of the present invention.
Figure 6:
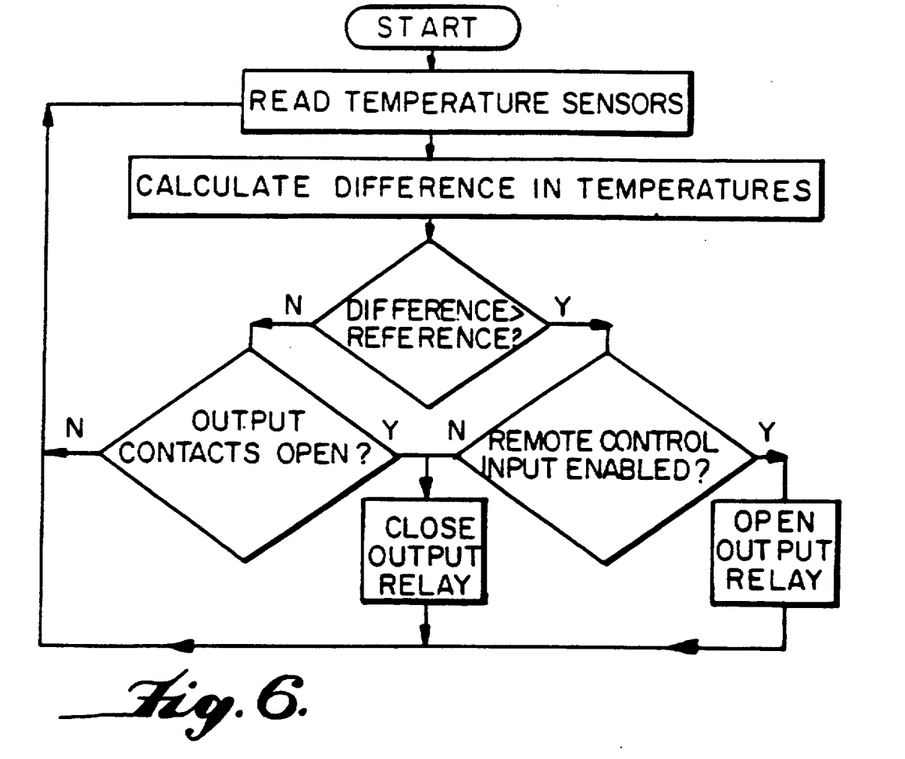
FIG. 6 is a logic flow diagram for a digital load management control system of the present invention.

With reference to FIG. 5 and 6, a digital load management control system 110 is shown. An indoor temperature sensor 112 and an outdoor temperature sensor 118 are provided each which produce an output voltage proportionate to temperature being sensed at any given point in time. These temperature sensors are substantially similar to those discussed above at 12 and 18.

The output of the temperature sensors 112, 118 is sent to conventional analog to digital converters 120 to convert the analog voltages into digital representations, which can be used by the microprocessor 126. Latch circuits 122 are provided to interface the digital outputs of the analog to digital converters 120 to the microprocessor 126 as well as the remote control input and relay control output of the control system. The external remote control input is interfaced to the latch circuit 122 by interface circuit 124 to provide proper signal conversion and protection against abnormal conditions such as surges. The latch circuits 122 permit the microprocessor 126 to read and store data until it is ready for processing or a change of state.

As shown in FIG. 5, an external remote control input 130 is provided to permit an external remote control system to enable or disable the function of load management control, which is similar to the analog control input 30. A relay driver 132 is used to develop adequate power from the output latch circuitry to drive the output relay 134. The output relay 134 serves the same function as the output relay of the analog system discussed above.

Figure 9:
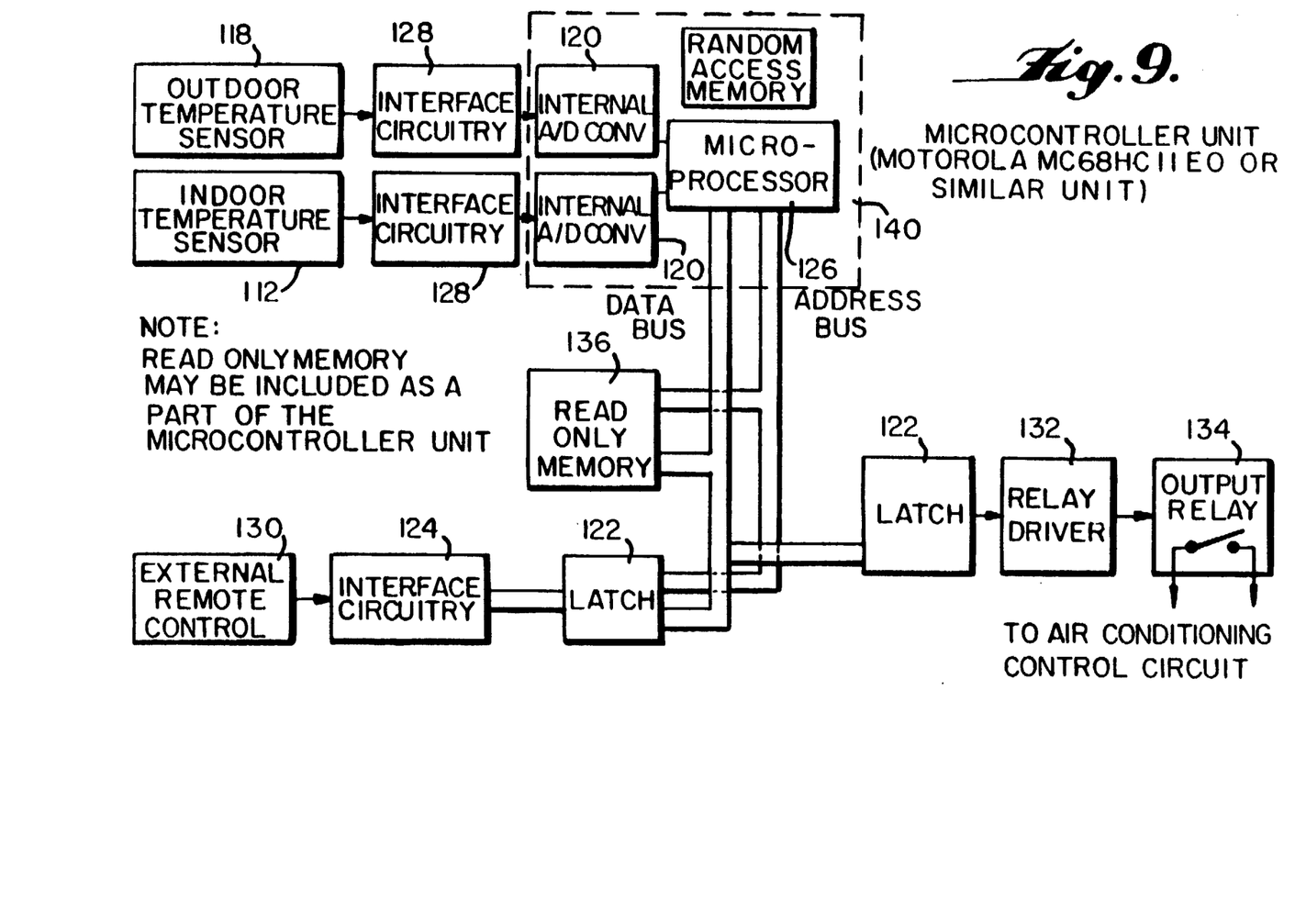
FIG. 9 is a schematic diagram of a digital air conditioner load management control using a microcontroller in accordance with the principles of the present invention.

A conventional microprocessor 126 controls all operations of the digital load management control system 110 including data acquisition from input devices and control of the output relay 134, based on instructions in a control program. The microprocessor 126 preferably includes the ability to perform analog to digital conversion as well as digital processing functions. As an alternative to the circuit of FIG. 5, FIG. 9 shows a microcontrol unit 140 (Motorola MC68HC11EO or equivalent) which includes the microprocessor 126. A Read Only Memory (ROM) device 136 is also provided. Physical storage of the control program is implemented in the read only memory or other non-volatile storage media in order to avoid corruption by abnormal operating conditions.

As shown in FIG. 6, the control program contains routines for performing calculations and logic functions implemented by hardware in the analog control. These functions include:

(a) reading data from temperature sensors,
(b) calculating the difference between indoor and outdoor temperatures;
(c) providing a reference value for calculating the reference control function;
(d) monitoring of the remote control input to determine if the load management function should be active or inactive; and
(e) generating a control output based upon the values from the set point control function and remote control input.

Multiple fixed settings can be provided for the digital system by using several inputs for remote control and programming the system to produce various temperature differential settings, depending on which input receives a control signal.

Microprocessor based digital air conditioning load management control offers significant flexibility over analog design for the support of optional features. The high temperature set point can be implemented in the program by comparing the value of the inside temperature to a set value in program memory and limiting load reduction to the predefined maximum value.

Figure 11:
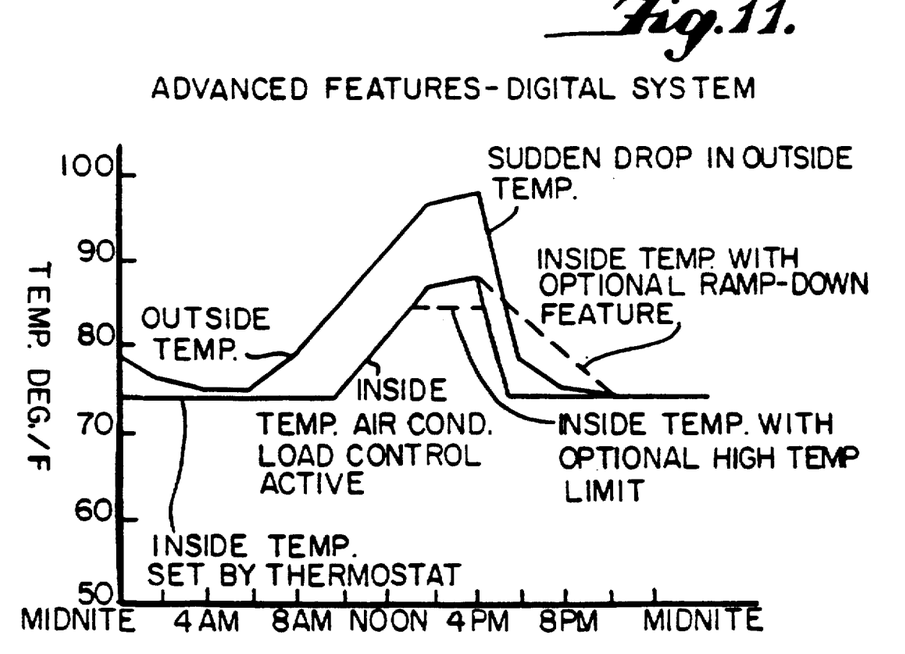
FIG. 11 is a graph showing the operation of the load management control system having a ramp-down feature.

A microprocessor based control will also permit ramping of inside temperature changes so they cannot take place faster than a predetermined rate. This feature is beneficial in limiting the rate of change for inside temperatures in the event of sudden weather changes. A sudden drop in outside temperature could result in a corresponding drop in the differential between inside and outside temperatures causing the air conditioning system to operate continuously until either the thermostat is satisfied or the temperature differential is reestablished. The use of a ramping function to gradually decrease the inside temperature under these conditions will maintain the effectiveness of the load control until normal operating conditions are established after a sudden weather change. This function can be implemented in software by dropping the inside temperature in small increments that are timed to slow the drop of the inside temperature. This feature is shown in FIG. 11 below.

Thus, either an analog or digital approach to provide load management produces the same result. The system 10 is remotely controlled to provide load control when required. This is accomplished by controlling a contact closure from an existing load management controller 14. The illustrated embodiment is for a dry contact external control. However, as stated above, the load management control system can operate from other types of input if proper interface circuits are included. As discussed above, additional circuitry may permit the system 10 to be integrated into other systems such as radio paging. Since the system 10 has the ability to control through an entire load shed cycle with only one command, the system 10 may share communication facilities with other applications without significant performance degradation.

Figure 2:
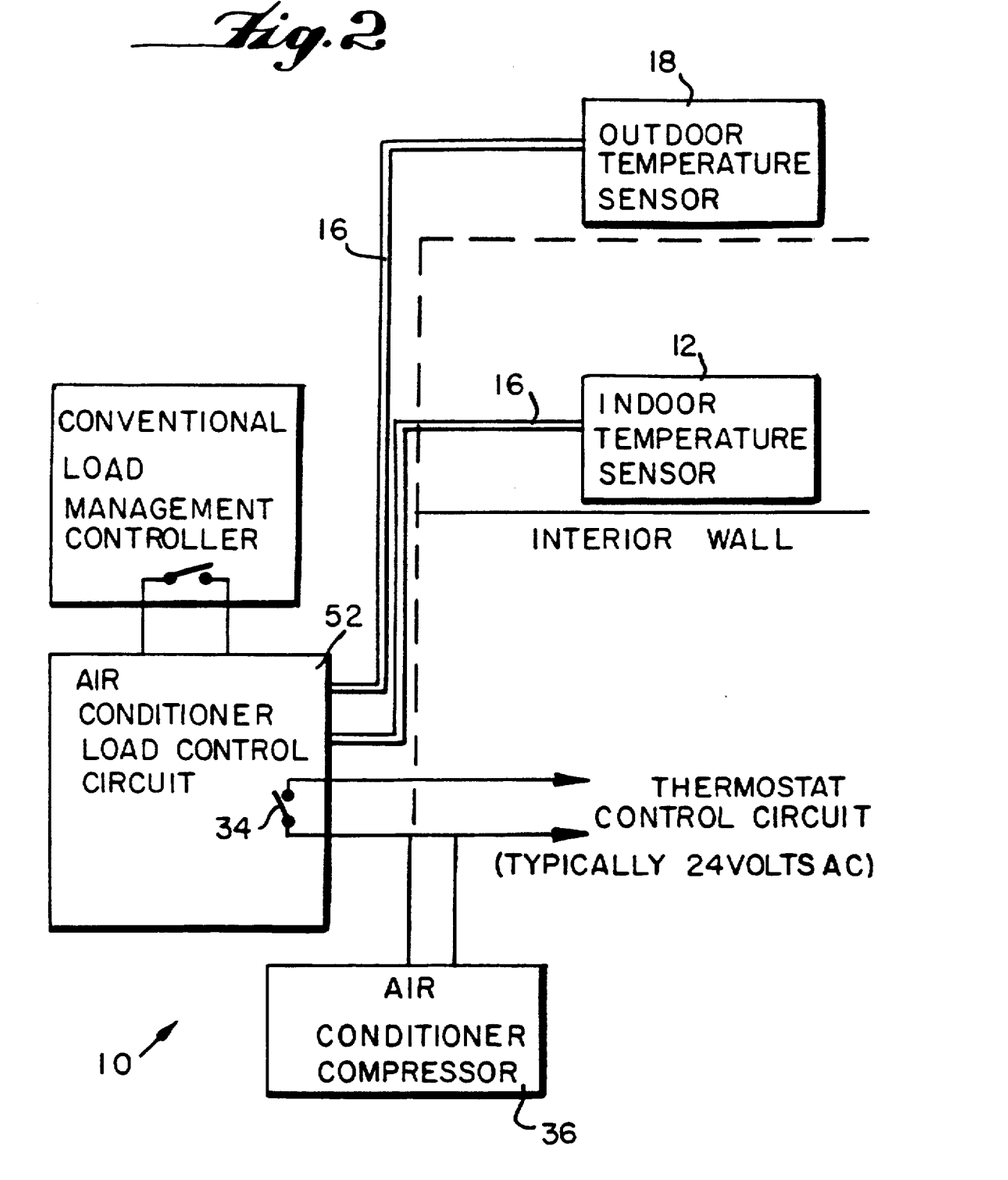
FIG. 2 is a schematic installation diagram of an air conditioning load management control system provided in accordance with the principles of the present invention.
Figure 3:
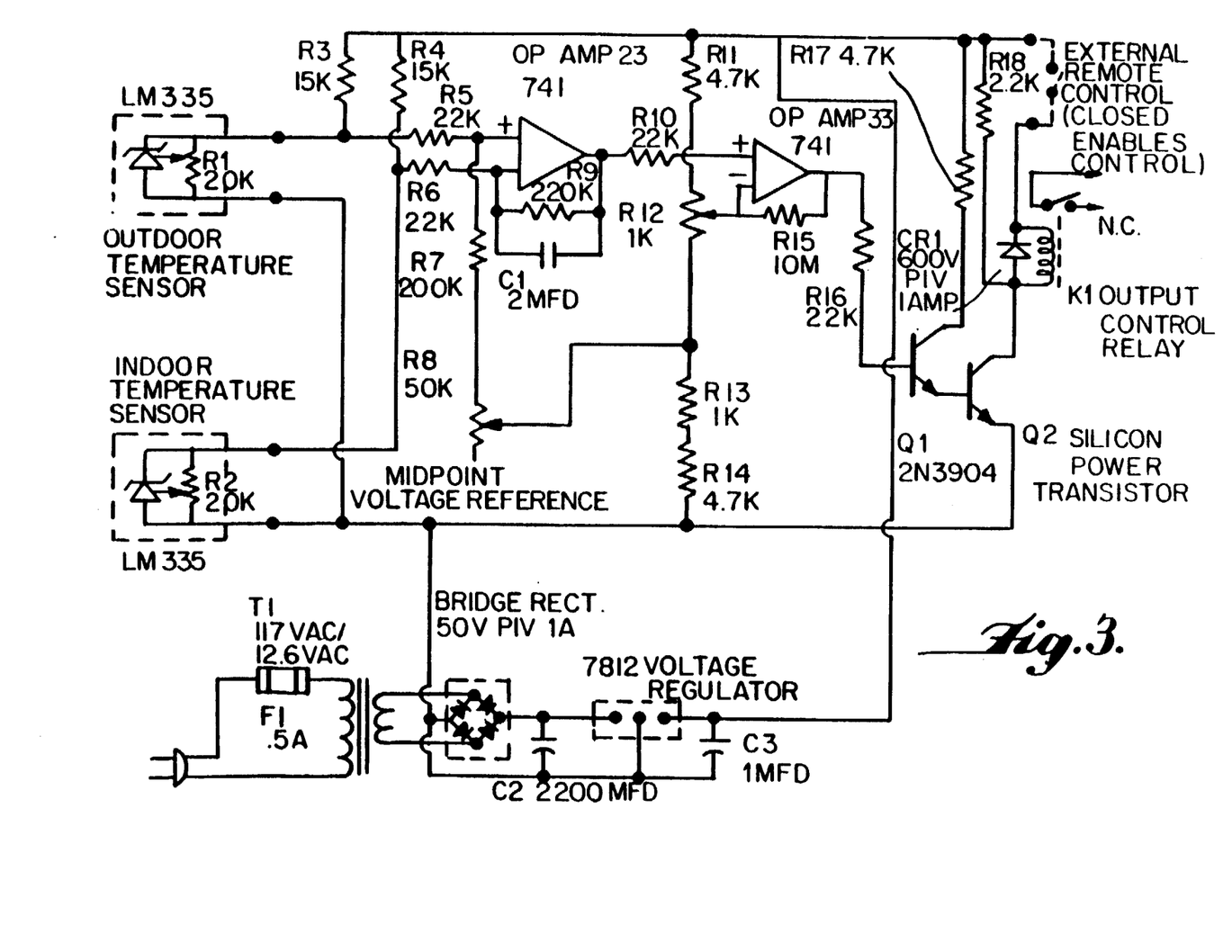
FIG. 3 is a schematic diagram of an analog circuit of the present invention.

Referring to FIG. 2, the installation of the load control management system is shown. The air conditioner load control circuit 52, which includes the integrated circuit, is installed adjacent to or inside of the load management controller 14. The air conditioner load control circuit is connected to the controller 14. The outdoor temperature sensor 18 is preferably installed on the north side of the building and is connected to the air conditioner load control circuit 52 directly. The indoor temperature sensor 12 is installed on the inside wall of the building using the same general guidelines for installing a thermostat. A location close to the outdoor temperature sensor is preferred to limit the amount of wiring required. The indoor temperature sensor is also connected to the air conditioner load control circuit. The output relay 34 is then connected in series with 24 volt compressor control circuit.

Once installed, the system 10 can provide approximately 30 percent reduction in air conditioning load based upon an indoor temperature rise from 75 degrees to 83 degrees Fahrenheit for an outside temperature rise of 100 degrees Fahrenheit.

It can be seen that the system 10 of the present invention provides an effective means of reducing air conditioner load requirements during peak periods without the use of complicated algorithms or the need to address the specific building characteristics when the system is installed.

While the invention has been described in connection with what is presently considered to be the most practical and preferred embodiment, it is understood that the invention is not limited to the disclosed embodiment but, on the contrary, is intended to cover various modifications and equivalent arrangements included within the spirit and scope of the appended claims.

What is claimed is:

1. A load management control system for an air conditioner comprising:
    an outdoor temperature sensor for sensing outdoor temperature of the outside of an enclosure to be air-conditioned;
    an indoor temperature sensor for sensing an indoor temperature of the enclosure;
    means for determining a difference in output of said indoor and outdoor temperature sensors;
    means for comparing said difference in output of said indoor and outdoor temperature sensors with a reference input;
    means for detecting an external controlling signal from an input device coupled to said system;
    means for controlling an air conditioner control circuit based upon input from said comparing means and said detecting means, whereby, when an allowable temperature differential is exceeded while the external controlling signal is detected, said controlling means interrupts operation of said air conditioner control circuit so as to reduce electrical load, said controlling means restoring the operation of said air conditioner control circuit when said temperature differential is no longer exceeded.

2. A load management control system as claimed in claim 1, further comprising:
    means for comparing said inside temperature to a preset limit to determine whether said inside temperature exceeds said preset limit; and
    means for blocking control of said controlling means when said indoor temperature exceeds said preset limit.

3. A load management control system as claimed in claim 1, further comprising means for ramping inside temperature changes so as to not take place faster than a predetermined rate when a sudden drop in outside temperature occurs.

4. A load management control system as claimed in claim 1, wherein said external control device is a load management controller having a dry contact.

5. A load management control system as claimed in claim 1, wherein said external control device is a communications subsystem.

6. A load management control system as claimed in claim 1, wherein said determining means and said comparing means are each operational amplifiers analog circuits.

7. A load management control system as claimed in claim 1, wherein said controlling means controls an output relay, said relay being connected to said air conditioner control circuit.

8. A load management control system as claimed in claim 1, wherein said determining means, said comparing means, said detecting means and said controlling means is a microprocessor.

9. A method of controlling an air conditioning system comprising the steps of:
    operating the air conditioning system at full load;
    determining a temperature outside an enclosure to be air conditioned;
    determining a temperature inside said enclosure;
    determining the difference between said inside and outside temperatures;
    interrupting a control circuit of a cooling device of said air conditioning system when said difference exceeds a predetermined differential so as to reduce electrical load; and
    resuming operation of said cooling device at full load when said inside temperature rises to reduce the difference between said inside and outside temperature below said predetermined differential.

10. A method of controlling an air conditioning system as claimed in claim 9, wherein the steps of determining a difference between inside and outside temperatures, and interrupting and resuming the operation of said cooling device are is accomplished by an analog circuit.

11. A method of controlling an air conditioning system as claimed in claim 9, wherein the steps of determining a difference between inside and outside temperatures, and interrupting and resuming the operation of said cooling device are is accomplished by a digital circuit.

12. A method of controlling an air conditioning system comprising the steps of:
    establishing an inside temperature set point;
    operating the air conditioner at full load;
    determining a temperature outside an enclosure to be air conditioned;
    determining a temperature inside said enclosure;

determining the difference between said inside and outside temperatures;

interrupting a control circuit of a cooling device of said air conditioning system when said difference exceeds a predetermined differential so as to reduce electrical load; and preventing said indoor temperature from exceeding a predetermined value greater than said inside temperature set point by cooling said enclosure while at a reduced load; and resuming operation of said cooling device at full load when said inside temperature rises to reduce the difference between said inside and outside temperature below said predetermined differential.

* * * * *